United States Patent
Meamber

(10) Patent No.: US 7,579,036 B2
(45) Date of Patent: Aug. 25, 2009

(54) METHOD FOR MAKING PARTIALLY POPPED POPCORN

(76) Inventor: Timothy Meamber, 404 Third St., Yreka, CA (US) 96097

( * ) Notice: Subject to any disclaimer, the term of this patent is extended or adjusted under 35 U.S.C. 154(b) by 563 days.

(21) Appl. No.: 11/365,463

(22) Filed: Mar. 1, 2006

(65) Prior Publication Data
US 2007/0207252 A1 Sep. 6, 2007

(51) Int. Cl.
*A23L 1/18* (2006.01)
(52) U.S. Cl. .................. 426/618; 426/449; 426/455; 426/462; 426/465; 426/808
(58) Field of Classification Search .............. 426/618, 426/449, 455, 462, 465, 808, 74, 620, 615, 426/640, 639, 658
See application file for complete search history.

(56) References Cited

U.S. PATENT DOCUMENTS

| | | | | |
|---|---|---|---|---|
| 3,704,133 A | * | 11/1972 | Kracauer | 426/93 |
| 4,152,974 A | * | 5/1979 | Tienor | 99/323.8 |
| 4,876,099 A | * | 10/1989 | MacGregor et al. | 426/242 |
| 5,409,729 A | * | 4/1995 | Friesen | 426/625 |
| 6,156,365 A | * | 12/2000 | Liwszyc | 426/510 |

\* cited by examiner

*Primary Examiner*—Helen F Pratt
(74) *Attorney, Agent, or Firm*—Thomas E. Loop

(57) ABSTRACT

A method for making partially popped popcorn from hulled corn kernel is provided. A hulled corn comprising a pericarp structure and interior endosperm having an internal moisture content is modified, such as by boiling, soaking or steaming, to achieve a predetermined moisture content sufficient to inhibit but not prevent popping of the kernel. The modified kernel is exposed to a heated environment, such as a hot air popper, until the modified endosperm expands and ruptures the endosperm, resulting in a partially popped kernel.

7 Claims, No Drawings

METHOD FOR MAKING PARTIALLY POPPED POPCORN

CROSS-REFERENCE TO RELATED APPLICATIONS

Not applicable

STATEMENT REGARDING FEDERALLY SPONSORED RESEARCH AND DEVELOPMENT

Not applicable

BACKGROUND OF THE INVENTION

1. Field of the Invention

The invention generally relates to the field of edible, hulled grain snack products. Specifically, the invention relates to a method of processing unpopped grain kernels such as popcorn kernels, whereby the popping mechanism is suppressed so that the resultant product is a partially-popped kernel that retains the desirable flavors of a fully popped kernel but provides a denser, richer food or snack food product.

2. Background of the Invention

Cereal-based food products are a prevalent source of nutrition for humans and livestock, particularly, corn, wheat and rice-based products. The individual kernels of these and other cereal grains may be processed in a variety of ways to produce numerous foodstuffs, including many forms of snack products.

Grain kernels are generally comprised of a relatively strong outer hull, referred to as a pericarp, a starchy interior material, referred to as endosperm, and the germ, which, upon germination, is the genesis the underlying grain plant.

The hull/pericarp generally covers the exterior of the kernel. The endosperm comprises a large internal volume of the kernel and provides a source of energy for kernel germination and growth. Because the endosperm of the kernel is nutrient rich and comprises the majority of the kernel itself, food products derived from grain are primarily comprised of the endosperm material.

Popped corn is a well-know grain kernel-based snack food that is popular for both its flavor and texture. There is evidence that popcorn has been consumed by humans for over 5,400 years and it is believed that popcorn was brought to Western culture at least as early as the time of Christopher Columbus. It is estimated by the U.S. Popcorn Board that Americans consume approximately 17 billion quarts of popped popcorn each year.

Another popular snack item is flavored popcorn such as is disclosed in U.S. Pat. No. 4,640,842, "Internally Flavored Hulled Cereal Grain and Process for Preparation", issued Feb. 3, 1987, and which is incorporated herein by reference.

Research has indicated that the "popping" mechanism associated with popcorn is the result of the cooperation of the moisture contained in the endosperm and the containment and rupture of the pericarp as is more fully discussed below.

Typically, commercially available popcorn available to consumers such as Orville Redenbacher or Jiffy Pop from ConAgra Foods, Inc., has moisture content within the endosperm of the kernel of about 13.5 to 14.5%. These kernels will further comprise a pericarp structure that is strong and lacking any damage such as fractures, fissures or weak spots.

When the kernel is exposed to a sufficiently high temperature, the moisture in the endosperm heats, boils and expands within the pericarp structure, which begins to function somewhat like a pressure-cooking vessel.

As the moisture in the endosperm continues to expand, pressure continues to increase upon and within the starchy endosperm contained within the pericarp. It is estimated that the internal pressure contained in a good quality pericarp structure can be in the range of nine atmospheres (ATMs) or about 130 PSI. When the pressure within the pericarp exceeds the capacity to retain it, the pericarp will rupture and explode. At that instant, the moisture distributed throughout the endosperm is immediately exposed to a lower atmospheric pressure and abruptly expands, turning the kernel inside out and generating a fluffy endosperm, which is what is typically referred to as popcorn.

When the pericarp of a kernel is weak or damaged, the kernel may not pop at all due to steam exiting the damaged pericarp or to the fact that the endosperm moisture is too high to allow the proper internal kernel popping conditions to exist.

An alternative result occurs when endosperm moisture content levels are greater than 14%. Under appropriate endosperm moisture conditions, the kernel will partially pop, where the endosperm only partially expands. These, or unpopped kernels are sometimes referred to as "Old Maids".

Many popcorn consumers find the taste and texture of these partially popped kernels desirable. There is therefore a need to provide a method for making a partially popped grain kernel, such as from unpopped popcorn, that is both simple and low cost and which will produce a product that is flavorful and provides a texture that is appealing to consumers.

SUMMARY OF THE INVENTION

The invention comprises a process whereby a grain kernel, such as a popcorn kernel, is modified so that the internal moisture of the endosperm is increased to a predetermined modified moisture content wherein the popping mechanism is suppressed or inhibited in order to produce a partially popped kernel.

Generally, the moisture content of the endosperm is increased, such as by boiling, soaking or steaming the kernels for a predetermined period to achieve a predetermined moisture content. The kernels are dried of exterior moisture, such as by air, in a manner that permits the predetermined moisture level to remain in the kernel prior to popping. The modified kernel is then exposed to a heated environment, such as a hot air stream in a hot air popper for a time sufficient to cause the modified endosperm to expand and rupture the pericarp.

The increased moisture in the endosperm suppresses, but does not prevent, the popping mechanism. This, in turn, results in a partially popped kernel with the desirable flavor and texture attributes noted above. A suitable flavorant may be added to the solution used to increase moisture content in the endosperm or, in an alternative embodiment, a flavorant may be added to surface of the popped kernel, such as salt, spices or the like.

While the claimed method is described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following detailed description of the preferred embodiments which are presented as examples of the invention defined in the claims. It is expressly understood that the invention as defined by the claims may be broader than the embodiments described below.

DETAILED DESCRIPTION OF THE INVENTION

In the preferred embodiment of the invention, a hulled grain kernel is provided comprising an outer hull or pericarp and having an interior volume comprising an endosperm material. In an alternative preferred embodiment, popcorn kernels are utilized, such as the commonly available *Zea mays* L. subsp. *Mays* variety. It is noted that the instant invention is not limited to the use of popcorn kernels and that the use of any variety grain kernel with the capacity to be popped can be incorporated into the process such as other corn varietals, wheat, or rice kernels.

A natural pericarp structure is a preferred structure for the grain kernel but it is noted that artificial means to create an exterior hull structure that functions in a manner of that of a naturally occurring pericarp during the popping process is considered within the scope of the invention. For instance, an artificially applied edible polymer or cellulous or their equivalent coating may be provided upon a grain kernel to replace, imitate or enhance a naturally occurring pericarp structure. This can provide the ability to pop certain grains not generally used to create a popped grain food or used to enhance the poppability of popcorn strains that do not have sufficiently strong pericarp structures to generate internal pressures necessary for the endosperm to rupture the pericarp upon heating.

The grain kernel is provided with a preexisting internal moisture content of the endosperm, which, in the case of popcorn, typically ranges from 13.5% to 14.5%. It is generally accepted that deviations as low as 1% to 2% below this range render the kernels too dry to pop.

In the preferred embodiment of the invention, the preexisting moisture content of the endosperm is increased to a predetermined modified level whereby the popping mechanism is inhibited or suppressed. It has been determined that, for popcorn, a modified moisture content of greater than about 20% but less than about 40% has produced acceptable results with a modified moisture content of about 25% to 38% providing a optimal product. Modified moisture contents greater than 40% can produce acceptable results depending on drying and popping process variables and all modified moisture levels greater than 18% are considered within the scope of the invention.

In the preferred mode, the moisture content is modified by introducing unprocessed popcorn kernels with a preexisting moisture content of about 13.5% to about 14.5% to boiling water with at temperature of about 212 degrees F. for a period of about 25 minutes to 40 minutes. The process step or equivalent may also introduce weakened areas, cracks or fractures into the pericarp structure which assists in suppressing the popping mechanism by causing the pericarp to rupture sooner that occurs in an unprocessed kernel.

Alternative embodiments include soaking of the kernels in water or processing the kernels in a pressurized vessel in heated water for a period sufficient to modify the moisture content to the preferred level. A flavorant may be added to the processing liquid if a flavored end product is desired.

Preferably, substantially all of the external moisture on the modified kernels is then removed as by air or mechanical drying but it is important that the drying process be controlled so that the modified moisture content is not substantially affected during drying. Over-drying of exterior moisture risks reducing interior moisture content to a level that will affect the popping process and result in a less than optimal end product. It has been determined that air drying for a period of about 2 hours to 5 hours provides good results with a period of less than three hours being preferred.

The modified kernels are then introduced into a heated environment such as heated air or oil until the modified moisture content of the endosperm boils and expands sufficient to rupture the pericarp, i.e., the kernel pops. It has been determined that hot air popping at about 330 degrees F. to about 360 degrees F. provides the best resulting product.

Once popped, the modified kernels have a rich, concentrated flavor of the underlying kernel and a dense, chewy texture.

The popped kernels may optionally be coated with a variety of flavorants, salts, spices, sweetened coatings and the like to provide a relatively low calorie, low cost snack food product.

Many alterations and modifications may be made by those having ordinary skill in the art without departing from the spirit and scope of the invention. For instance, by way of example and not by limitation, any suitable means of introducing modified moisture content into the endosperm to suppress but not eliminate popping of the kernel is within the scope of the invention.

Therefore, it must be understood that the illustrated embodiment has been set forth only for the purpose of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed even when not initially claimed in such combinations.

The words used in this specification to describe the invention and its various embodiments are to be understood not only in the sense of their commonly defined meanings, but to include by special definition in this specification, structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are therefore defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can, in some cases be excised from the combination and that the claimed combination may be directed to a sub-combination or variation of a sub combination.

Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the fundamental idea of the invention.

I claim:

1. A process for making partially popped popcorn comprising the steps of:
   providing a plurality of corn kernels with each corn kernel having a pericarp structure and an interior volume comprising endosperm material with a preexisting moisture content of less than about 18% water;
   modifying said preexisting moisture content of said endosperm material of each of the plurality of corn kernels to a predetermined moisture content comprising greater than about 18% water to create a modified plurality of corn kernels, wherein the plurality of corn kernels are modified by heating in water for a period of time sufficient to introduce cracks or fractures to the pericarp structure of at least some of the plurality of corn kernels; and,
   exposing said modified plurality of corn kernels to a heated environment whereby said modified plurality of corn kernels are popped to thereby yield partially popped popcorn.

2. The process of claim 1 wherein each corn kernel is a popcorn kernel.

3. The process of claim 1 wherein each corn kernel is of the *Zea mays* L. subsp. *Mays* variety.

4. The process of claim 1 wherein said predetermined moisture content of each corn kernel is modified by boiling each corn kernel in water for a period of between about 20 minutes to about 40 minutes at a temperature of about 212 degrees F.

5. The process of claim 1 wherein said heated environment is a heated air stream.

6. The process of claim 5 wherein said heated air stream has a temperature of between about 330 degrees F. and about 360 degrees F.

7. A process for making a partially popped popcorn kernel comprising the steps of:
   providing an unpopped popcorn kernel;
   boiling said unpopped popcorn kernel in water at about 212 F. for a period of between 20 minutes to about 40 minutes; and,
   exposing said boiled and unpopped popcorn kernel to a heated environment whereby said boiled popcorn kernel is partially popped to thereby yield the partially popped popcorn kernel.

* * * * *

UNITED STATES PATENT AND TRADEMARK OFFICE
CERTIFICATE OF CORRECTION

PATENT NO.       : 7,579,036 B2                                    Page 1 of 1
APPLICATION NO. : 11/365463
DATED            : August 25, 2009
INVENTOR(S)      : Timothy Meamber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Fourteenth Day of September, 2010

David J. Kappos
*Director of the United States Patent and Trademark Office*